US012420574B2

(12) United States Patent
Minemura et al.

(10) Patent No.: US 12,420,574 B2
(45) Date of Patent: Sep. 23, 2025

(54) TRANSPORT DEVICE AND DROPLET EJECTING DEVICE

(71) Applicant: SEIKO EPSON CORPORATION, Tokyo (JP)

(72) Inventors: Satoshi Minemura, Matsumoto (JP); Tomonori Amari, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 18/461,236

(22) Filed: Sep. 5, 2023

(65) Prior Publication Data

US 2024/0075761 A1 Mar. 7, 2024

(30) Foreign Application Priority Data

Sep. 7, 2022 (JP) ................................. 2022-141999

(51) Int. Cl.
*B41J 29/17* (2006.01)
*B41J 11/00* (2006.01)

(52) U.S. Cl.
CPC ............. *B41J 29/17* (2013.01); *B41J 11/007* (2013.01)

(58) Field of Classification Search
CPC ................................. B41J 29/17; B41J 11/007
See application file for complete search history.

(56) References Cited

U.S. PATENT DOCUMENTS

| | | | | |
|---|---|---|---|---|
| 5,436,713 | A * | 7/1995 | Bigelow | G03G 21/0035 399/353 |
| 2014/0198161 | A1 | 7/2014 | Kanemoto | |
| 2017/0217193 | A1 * | 8/2017 | Kanemoto | B41J 29/17 |
| 2021/0197597 | A1 * | 7/2021 | Kitahara | B65H 7/06 |
| 2022/0308503 | A1 * | 9/2022 | Yasuda | G03G 15/161 |

FOREIGN PATENT DOCUMENTS

JP 2014-136625 A 7/2014

* cited by examiner

*Primary Examiner* — Scott A Richmond
(74) *Attorney, Agent, or Firm* — WORKMAN NYDEGGER

(57) ABSTRACT

A transport device includes a transporting belt including an outer circumferential surface configured to come into contact with a medium, the transporting belt being configured to transport the medium, a rotating brush including a brush portion configured to come into contact with the outer circumferential surface, the rotating brush being configured to rotate, and a cleaning member including a contact portion configured to come into contact with the brush portion, the cleaning member being configured to clean the rotating brush. The contact portion includes a plurality of protrusions.

10 Claims, 6 Drawing Sheets

TRANSPORT DEVICE AND DROPLET EJECTING DEVICE

The present application is based on, and claims priority from JP Application Serial Number 2022-141999, filed Sep. 7, 2022, the disclosure of which is hereby incorporated by reference herein in its entirety.

BACKGROUND

1. Technical Field

The present disclosure relates to a transport device and a droplet ejecting device.

2. Related Art

JP-A-2014-136625 describes a transport device including a transporting belt that transports a medium and a rotating brush that cleans the transporting belt. Foreign materials such as fluff of the medium and dust in the air adhere to the transporting belt. Therefore, the rotating brush cleans the transporting belt to remove foreign materials from the transporting belt.

In such a transport device, the rotating brush cleans the transporting belt, so that foreign materials adhere to the rotating brush. When foreign materials remain adhering to the rotating brush, cleaning ability of the rotating brush is reduced.

SUMMARY

A transport device for solving the above-described problems includes a transporting belt including an outer circumferential surface configured to come into contact with a medium, the transporting belt being configured to transport the medium, a rotating brush including a brush portion configured to come into contact with the outer circumferential surface, the rotating brush being configured to rotate, and a cleaning member including a contact portion configured to come into contact with the brush portion, the cleaning member being configured to clean the rotating brush, in which the contact portion includes a plurality of protrusions.

A droplet ejecting device for solving the above-described problems includes a ejecting unit configured to eject a droplet onto a medium, a transporting belt including an outer circumferential surface configured to come into contact with a medium, the transporting belt being configured to transport the medium, a rotating brush including a brush portion configured to come into contact with the outer circumferential surface, the rotating brush being configured to rotate, and a cleaning member including a contact portion configured to come into contact with the brush portion, the cleaning member being configured to clean the rotating brush, in which the contact portion includes a plurality of protrusions.

DESCRIPTION OF EMBODIMENTS

Figure 1:
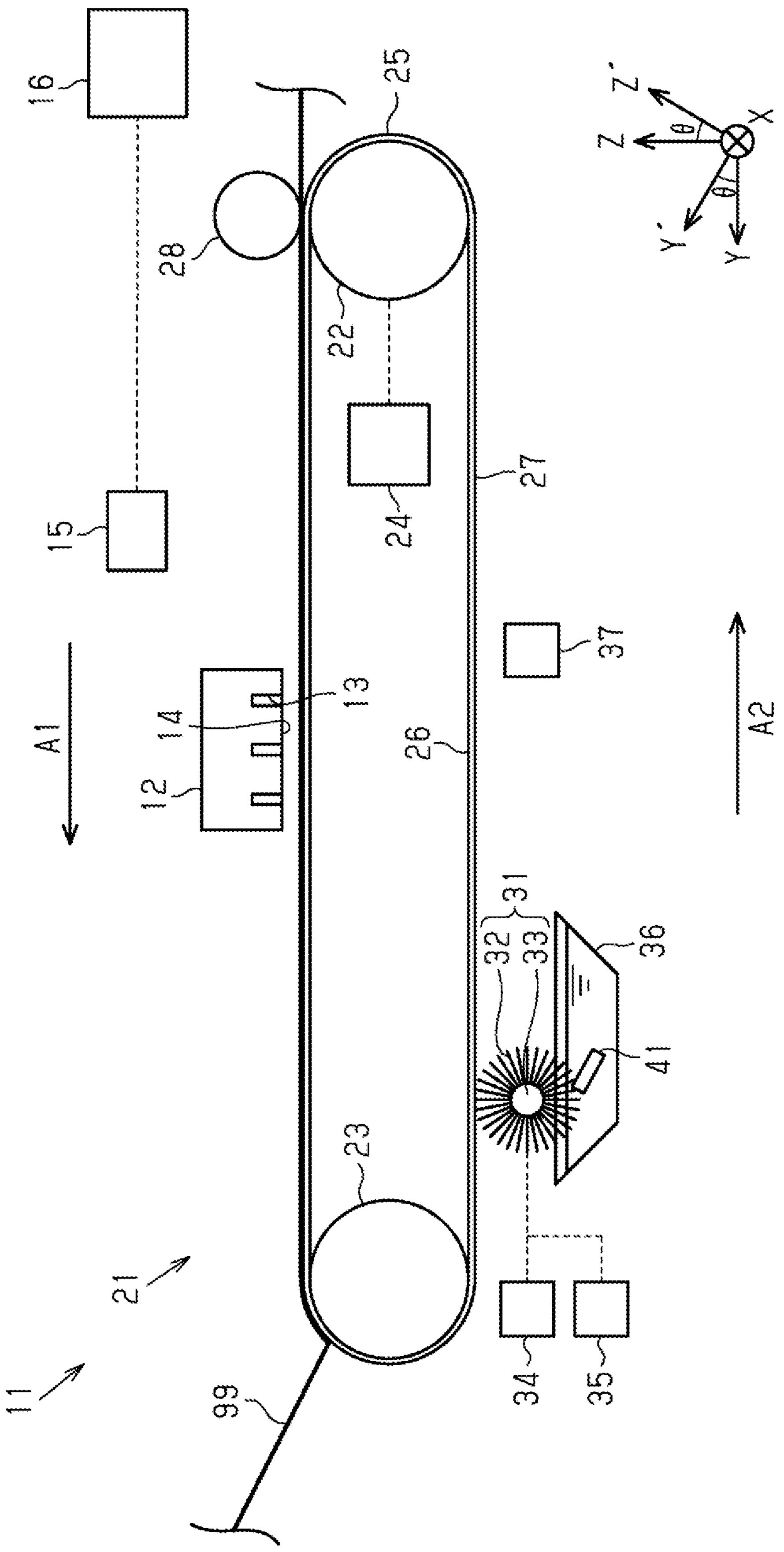
FIG. 1 is a side view illustrating one embodiment of a droplet ejecting device including a transport device.

One embodiment of a droplet ejecting device including a transport device will be described below with reference to the accompanying drawings. The droplet ejecting device is, for example, an ink jet-type printer that records an image of characters, photographs, or the like on a medium such as a sheet or fabric by ejecting ink, which is an example of a droplet.

Note that directions in the drawings will be described using an XYZ coordinate system in which an X-axis, a Y-axis and a Z-axis are orthogonal to each other, and an XY'Z' coordinate system in which an X-axis, a Y'-axis, and a Z'-axis are orthogonal to each other. At this time, in the XYZ coordinate system, a direction extending along the X-axis is referred to as an X direction, a direction extending along the Y-axis is referred to as a Y direction, and a direction extending along the Z-axis is referred to as a Z direction. Additionally, in the XY'Z' coordinate system, a direction along the X-axis is referred to as an X direction, a direction along the Y'-axis is referred to as a Y' direction, and a direction along the Z'-axis is referred to as a Z' direction. The XY'Z' coordinate system is a coordinate system obtained by rotating the XYZ coordinate system around the X-axis by θ. Therefore, in the XY'Z' coordinate system, the X-axis is the same as that in the XYZ coordinate system, the Y'-axis is inclined by θ with respect to the Y-axis, and the Z'-axis is inclined by θ with respect to the Z-axis.

Droplet Ejecting Device

As illustrated in FIG. 1, a droplet ejecting device 11 includes an ejecting unit 12. The ejecting unit 12 is configured to eject droplets onto a medium 99. The ejecting unit 12 includes a nozzle surface 14 at which one or more nozzles 13 are opened. The ejecting unit 12 records an image on the medium 99 by ejecting droplets from the nozzles 13 onto the medium 99. The ejecting unit 12 is, for example, a serial head that scans with respect to the medium 99. The ejecting unit 12 may be a line head capable of ejecting ink all at once throughout a width of the medium 99.

The droplet ejecting device 11 includes a control unit 15. The control unit 15 controls the droplet ejecting device 11. The control unit 15 controls, for example, the ejecting unit 12. The control unit 15 controls, for example, a transport device 21 to be described later. The control unit 15 may be a configuration of the transport device 21.

The control unit 15 may be configured with one or more processors that execute various types of processing according to a computer program. The control unit 15 may be configured with one or more dedicated hardware circuits such as an application-specific integrated circuit that executes at least a part of the various types of processing. The control unit 15 may be configured with a circuit including a combination of a processor and a hardware circuit. The processor includes a CPU and a memory such as a RAM and a ROM. The memory stores program codes or commands configured to cause the CPU to execute the processing. The memory, that is, a computer-readable medium, includes any readable medium that can be accessed by a general purpose or special purpose computer.

The droplet ejecting device 11 may include an operation unit 16. A user operates the droplet ejecting device 11 through the operation unit 16. When the user operates the operation unit 16, an instruction is input to the control unit 15. The operation unit 16 includes, for example, a panel for displaying information and an input device for inputting of an instruction. The operation panel 16 is, for example, a touch panel.

The droplet ejecting device 11 includes the transport device 21. The transport device 21 is configured to transport the medium 99. In a process in which the transport device 21 transports the medium 99, droplets are ejected from the ejecting unit 12 onto the medium 99.

Transport Device

The transport device 21 is configured to transport the medium 99 in a transport direction A1.

The transport device 21 includes two or more transport rollers. The transport device 21 includes, for example, a first transport roller 22 and a second transport roller 23. The first transport roller 22 is located upstream of the ejecting unit 12 in the transport direction A1. The second transport roller 23 is located downstream of the ejecting unit 12 in the transport direction A1.

The transport device 21 includes a driving source 24. The driving source 24 is coupled to at least one transport roller of the two or more transport rollers. The driving source 24 is coupled to, for example, the first transport roller 22. The first transport roller 22 is rotated by the driving source 24.

The transport device 21 includes a transporting belt 25. The transporting belt 25 is wound around the two or more transport rollers, that is, the first transport roller 22 and the second transport roller 23. When the driving source 24 rotates the first transport roller 22, the transporting belt 25 circulates along the first transport roller 22 and the second transport roller 23. In FIG. 1, the transporting belt 25 circulates in a counterclockwise direction. Thus, the transporting belt 25 transports the medium 99.

The transporting belt 25 includes an inner circumferential surface 26 and an outer circumferential surface 27. The inner circumferential surface 26 is a surface that comes into contact with the two or more transport rollers. The outer circumferential surface 27 is a surface that comes into contact with the medium 99. Therefore, it can also be said that the outer circumferential surface 27 is a surface that supports the medium 99. The outer circumferential surface 27 faces a nozzle surface 14.

The medium 99 is bonded to the transporting belt 25. That is, the medium 99 is bonded to the outer circumferential surface 27. Thus, the medium 99 is transported in stable posture. The transporting belt 25 is, for example, a belt coated with an adhesive. The adhesive is applied to the outer circumferential surface 27. In this case, the medium 99 is bonded to the outer circumferential surface 27 by the adhesive. For example, the medium 99 may be bonded to the outer circumferential surface 27 by suction force, electrostatic force, intermolecular force, or the like without being limited to the adhesive. The medium 99 is peeled off from the outer circumferential surface 27 by being pulled by another device, for example, after droplets are ejected by the ejecting unit 12. The transport device 21 may include a peeling unit that peels off the medium 99 from the outer circumferential surface 27. The peeling unit is, for example, a roller around which the medium 99 is wound.

The transport device 21 may include a pressing unit 28. The pressing unit 28 is configured to press the medium 99 against the transporting belt 25. The pressing unit 28 is, for example, a roller. The medium 99 is bonded to the outer circumferential surface 27 by the pressing unit 28 pressing the medium 99 against the transporting belt 25.

In the transporting belt 25, the outer circumferential surface 27 may be soiled as the medium 99 is transported. For example, foreign materials such as powder and fluff generated from the medium 99, dust in the air, and droplets from the ejecting unit 12 may adhere to the outer circumferential surface 27, and thus the outer circumferential surface 27 may be soiled. When the outer circumferential surface 27 is soiled, the soiling may be transferred to the medium 99, or adhesive force with respect to the medium 99 may be damaged.

The transport device 21 includes a rotating brush 31. The rotating brush 31 cleans the outer circumferential surface 27 by coming into contact with the outer circumferential surface 27. Thus, foreign materials are removed from the outer circumferential surface 27. As a result, the possibility that the soiling is transferred to the medium 99 and the possibility that adhesive force with respect to the medium 99 is damaged are reduced.

The rotating brush 31 comes into contact with the outer circumferential surface 27 after the medium 99 is peeled off. Therefore, the rotating brush 31 is located, for example, on an opposite side of the ejecting unit 12 with respect to the transporting belt 25. That is, the rotating brush 31 and the ejecting unit 12 are located so as to sandwich the transporting belt 25. Since the transporting belt 25 circulates, the transporting belt 25 includes a portion moving in the transport direction A1 and a portion moving in an opposite direction A2 opposite to the transport direction A1. The transport direction A1 coincides with the Y direction. Therefore, the opposite direction A2 is a direction opposite to the Y direction. The rotating brush 31 comes into contact with the portion of the transporting belt 25 moving in the opposite direction A2.

The rotating brush 31 includes a brush portion 32 and a shaft portion 33. The brush portion 32 extends outward from the shaft portion 33. A tip of the brush portion 32 comes into contact with the outer circumferential surface 27. Specifically, a portion, of the tip of the brush portion 32, located at an upper end of the rotating brush 31 comes into contact with the outer circumferential surface 27. The shaft portion 33 extends, for example, parallel to a shaft of the first transport roller 22 and a shaft of the second transport roller 23. That is, the shaft portion 33, the shaft of the first transport roller 22 and the shaft of the second transport roller 23 extend in the X direction. The rotating brush 31 rotates about the shaft portion 33. The rotating brush 31 may follow to rotate by being in contact with the transporting belt 25, or may be rotated by a driving unit 34 to be described later.

The transport device 21 may include the driving unit 34. The driving unit 34 is, for example, a motor. The driving unit 34 is coupled to the rotating brush 31. The driving unit 34 rotates the rotating brush 31. When the driving unit 34 rotates the rotating brush 31, foreign materials are easily removed from the outer circumferential surface 27.

The driving unit 34 rotates the rotating brush 31 in the same direction as the circulation direction of the transporting belt 25. This increases contact resistance between the rotating brush 31 and the transporting belt 25. In FIG. 1, when the rotating brush 31 rotates in the counterclockwise direction, the contact resistance with the transporting belt 25 increases. By the contact resistance between the rotating brush 31 and the transporting belt 25 increasing, foreign materials can be easily removed from the outer circumferential surface 27. Normally, the driving unit 34 rotates the rotating brush 31 in the same direction as the circulation direction of the transporting belt 25 while the transport device 21 transports the medium 99.

The driving unit 34 may rotate the rotating brush 31 in a direction opposite to the circulation direction of the transporting belt 25. In this case, the contact resistance between the rotating brush 31 and the transporting belt 25 decreases. In FIG. 1, when the rotating brush 31 rotates in a clockwise direction, the contact resistance with the transporting belt 25 decreases. When the contact resistance between the rotating brush 31 and the transporting belt 25 decreases, a load applied to the transporting belt 25 is reduced.

The transport device 21 may include a moving mechanism 35. The moving mechanism 35 is a mechanism that moves the rotating brush 31. The moving mechanism 35 displaces the rotating brush 31 between a position where the rotating brush 31 comes into contact with the transporting belt 25 and a position where the rotating brush 31 is separated from the transporting belt 25. For example, the moving mechanism 35 raises and lowers the rotating brush 31. When the rotating brush 31 comes into contact with the transporting belt 25, a load is applied to the transporting belt 25 to no small extent. For example, when it is not necessary to clean the transporting belt 25, the load applied to the transporting belt 25 is reduced as the rotating brush 31 is separated from the transporting belt 25.

The transport device 21 may include a storage tank 36. The storage tank 36 is configured to store a cleaning liquid. The cleaning liquid is liquid for cleaning the transporting belt 25. The cleaning liquid is, for example, water. The cleaning liquid stored in the storage tank 36 may be supplied and discharged so as to be replaced with a predetermined amount of new cleaning liquid at predetermined time intervals.

The storage tank 36 is located with a part of the brush portion 32 immersed in the stored cleaning liquid. In other words, the rotating brush 31 is located with a part of the brush portion 32 immersed in the cleaning liquid stored in the storage tank 36. For example, the tip of the brush portion 32 located at a lower end of the rotating brush 31 is immersed in the cleaning liquid. As a result, the brush portion 32 comes into contact with the outer circumferential surface 27 in a state of being wet with the cleaning liquid. As a result, foreign materials can be easily removed from the outer circumferential surface 27.

The transport device 21 may include a drying mechanism 37. The drying mechanism 37 is configured to dry the outer circumferential surface 27 after cleaning by the rotating brush 31. When the transporting belt 25 is cleaned while the rotating brush 31 is wet with the cleaning liquid, the outer circumferential surface 27 gets wet with the cleaning liquid. Therefore, the drying mechanism 37 dries the outer circumferential surface 27 wet with the cleaning liquid. For example, the drying mechanism 37 may dry the outer circumferential surface 27 by heating the outer circumferential surface 27 or may dry the outer circumferential surface 27 by blowing air onto the outer circumferential surface 27.

The transport device 21 includes a cleaning member 41. The cleaning member 41 is a member that cleans the rotating brush 31. In FIG. 1, the cleaning member 41 extends, for example, in the Y' direction as viewed from the X direction. The cleaning member 41 cleans the rotating brush 31 by coming into contact with the brush portion 32. In the rotating brush 31, foreign materials removed from the outer circumferential surface 27 by cleaning the transporting belt 25 may adhere to the brush portion 32. When foreign materials remain adhering to the brush portion 32, cleaning ability of the rotating brush 31 may be reduced. Therefore, the cleaning member 41 removes foreign materials from the brush portion 32 by coming into contact with the brush portion 32. Thus, the cleaning ability of the rotating brush 31 is maintained. Further, the user does not need to manually clean the rotating brush 31. Therefore, the user's effort is reduced.

The cleaning member 41 may be located in the storage tank 36. Specifically, the cleaning member 41 may be located at a position to be immersed in the cleaning liquid stored in the storage tank 36. The cleaning member 41 may come into contact with a portion of the brush portion 32 that is immersed in the cleaning liquid stored in storage tank 36. In this case, foreign materials are easily removed from the brush portion 32 by the cleaning liquid.

Figure 2:
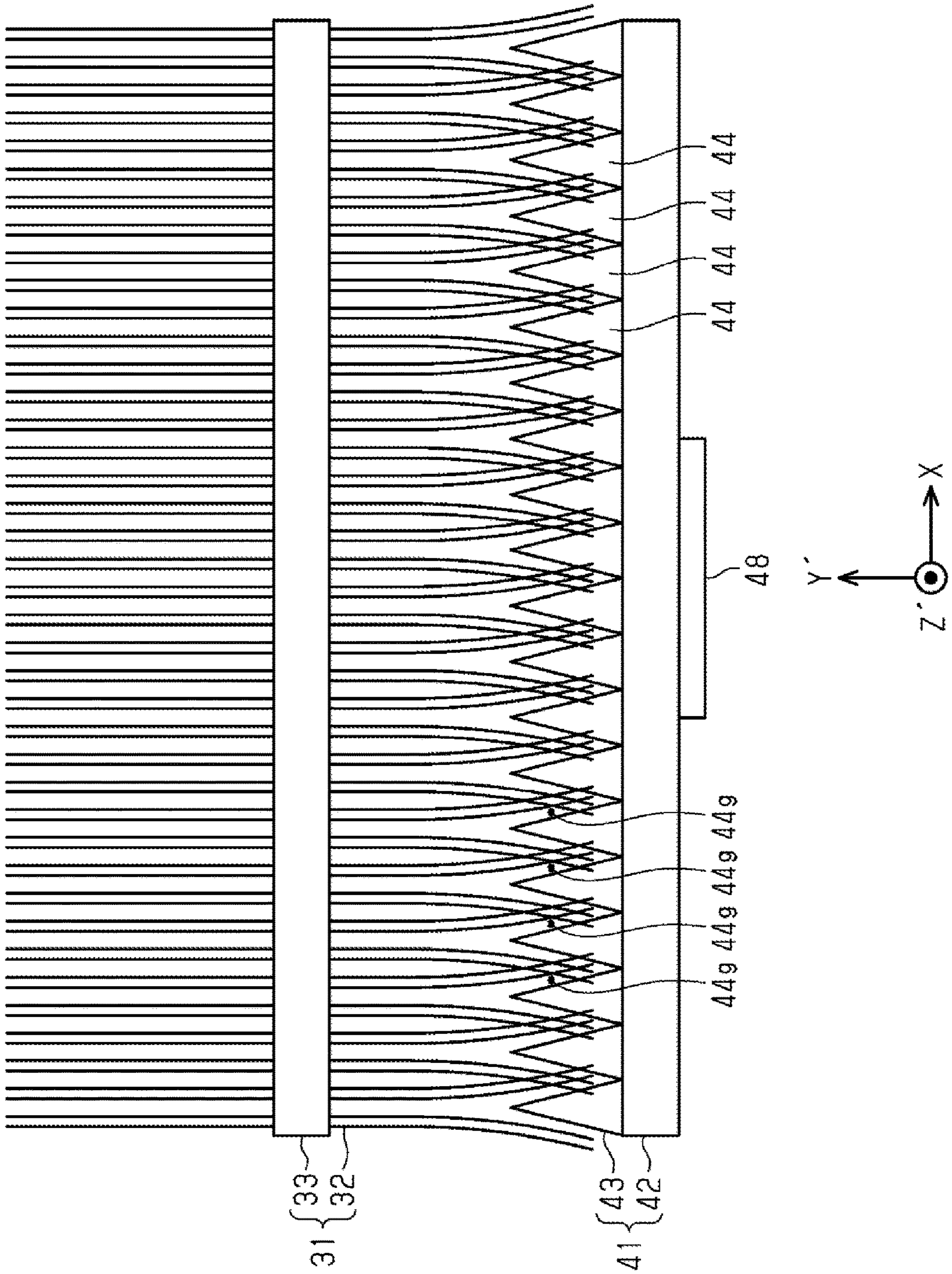
FIG. 2 is a top view of a cleaning member.

FIG. 2 is a top view of the cleaning member 41 as viewed from the Z' direction. As illustrated in FIG. 2, the cleaning member 41 includes a support portion 42 and a contact portion 43. The support portion 42 supports the contact portion 43. The support portion 42 has, for example, a plate shape. The contact portion 43 comes into contact with the brush portion 32. The contact portion 43 includes a plurality of protrusions 44. The plurality of protrusions 44 are arranged in a direction in which the shaft portion 33 extends, that is, in the X direction. Each protrusion 44 extends in the Y' direction. The plurality of protrusions 44 are arranged across a width of the rotating brush 31. A plurality of grooves **44*g* are formed at the contact portion 43 by the plurality of protrusions 44. Each groove 44*g* is a gap between the two adjacent protrusions 44. Each of the plurality of protrusions 44** has, for example, a triangular shape.

The plurality of protrusions 44 come into contact with the rotating brush 31 so as to bite into the brush portion 32. For example, the plurality of protrusions 44 each come into contact with the brush portion 32 so as to push aside the brush portion 32. As a result, the plurality of protrusions 44 catch or tear off foreign materials adhering to the brush portion 32. As a result, foreign materials adhering to the brush portion 32 are removed.

The cleaning member 41 comes into contact with the rotating brush 31 rotating. Thus, the cleaning member 41 cleans across an entire circumference of the rotating brush 31. The cleaning member 41 comes into contact with the rotating brush 31 which is rotated in the same direction as the circulation direction of the transporting belt 25 by the driving unit 34. The cleaning member 41 may come into contact with the rotating brush 31 that is rotated by the driving unit 34 in a direction opposite to the circulation direction of the transporting belt 25, or may come into contact with the rotating brush 31 that rotates with respect to the circulation of the transporting belt 25 in a driven manner.

Figure 3:
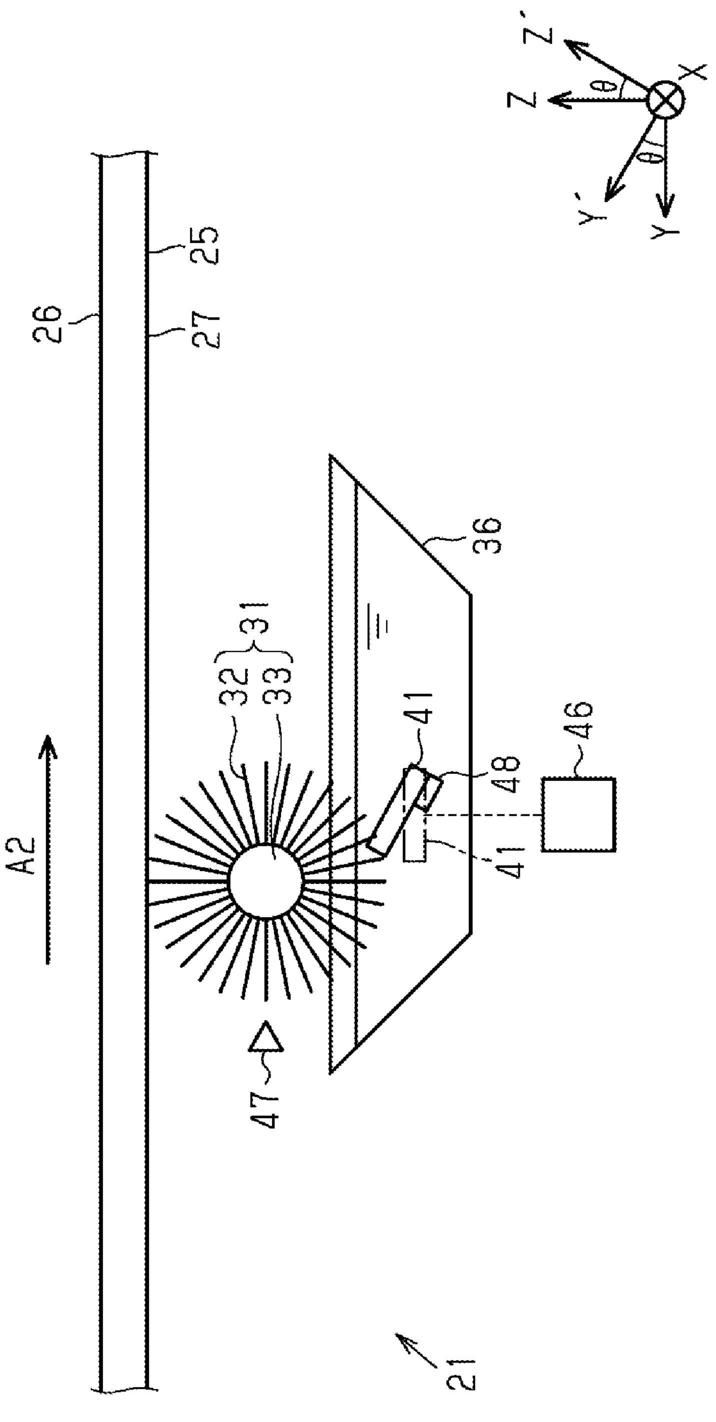
FIG. 3 is an enlarged view of the cleaning member in FIG. 1.

As illustrated in FIG. 3, the transport device 21 may include a switching mechanism 46. The switching mechanism 46 is a mechanism that switches a position of the cleaning member 41. The switching mechanism 46 switches the position of the cleaning member 41 between a contact position and a retracted position. The contact position is a position where the cleaning member 41 comes into contact with the brush portion 32. At the contact position, the cleaning member 41 is located so as to extend in the Y' direction. In FIG. 3, the cleaning member 41 indicated by a solid line is located at the contact position. The retracted position is a position where the cleaning member 41 is retracted from the brush portion 32, that is, a position where the cleaning member 41 does not come into contact with the brush portion 32. At the retracted position, the cleaning member 41 is located so as to extend in the Y direction. In FIG. 3, the cleaning member 41 indicated by a two dot chain line is located at the retracted position. For example, the switching mechanism 46 rotates the cleaning member 41 about a base end thereof. In other words, the switching mechanism 46 switches the extending direction of the cleaning member 41 between the Y' direction and the Y direction by rotating the cleaning member 41. As a result, a tip of the cleaning member 41 moves. The tip of the cleaning member 41 comes into contact with the brush portion 32 or is separated from the brush portion 32. The tip of the cleaning member 41 is constituted by, for example, the contact portion 43. The base end of the cleaning member 41 is constituted by, for example, the support portion 42. Therefore, the switching mechanism 46 displaces the contact portion 43 by rotating the support portion 42.

The cleaning member 41 is located at the contact position when the rotating brush 31 is cleaned. The cleaning member 41 is located at the retracted position when the rotating brush 31 is not cleaned. When the cleaning member 41 constantly comes into contact with the brush portion 32, a load is applied to the brush portion 32. Therefore, by the cleaning member 41 being located at the retracted position, the load applied to the brush portion 32 is reduced. For example, when the control unit 15 determines that cleaning of the rotating brush 31 is necessary, the switching mechanism 46 switches the position of the cleaning member 41 to the contact position. The cleaning member 41 may come into contact with the rotating brush 31 that comes into contact with the transporting belt 25 or may come into contact with the rotating brush 31 that is separated from the transporting belt 25. By the cleaning member 41 being located at the contact position when the rotating brush 31 is separated from the transporting belt 25, cleaning efficiency is improved.

The switching mechanism 46 may be configured to switch the position of the cleaning member 41 among a plurality of contact positions and a retracted position. That is, the switching mechanism 46 may switch the extending direction of the cleaning member 41 between the Y' direction and the Y direction continuously or by stages. For example, the switching mechanism 46 may switch the position of the cleaning member 41 among a first contact position, a second contact position and a retracted position. The first contact position is a position where contact strength of the cleaning member 41 with respect to the brush portion 32 is larger than that at the second contact position. The contact strength is, for example, a contact pressure or a contact load of the cleaning member 41 with respect to the brush portion 32. For example, at the first contact position, the plurality of protrusions 44 come into contact with the brush portion 32 so as to bite deeper than at the second contact position. The second contact position is a position where the contact strength of the cleaning member 41 with respect to the brush portion 32 is smaller than that at the first contact position. For example, at the second contact position, the plurality of protrusions 44 come into contact with the brush portion 32 so as to bite shallower than at the first contact position. In this way, the switching mechanism 46 may switch the contact strength of the cleaning member 41 with respect to the brush portion 32 by switching the position of the cleaning member 41. Thus, the switching mechanism 46 can switch cleaning intensity by the cleaning member 41. As the contact strength of the cleaning member 41 with respect to the brush portion 32 increases, the cleaning intensity by the cleaning member 41 increases. The switching mechanism 46 may switch the position of the cleaning member 41 between the first contact position and the second contact position based on a degree of soiling of the rotating brush 31.

The switching mechanism 46 may switch the position of the cleaning member 41 by the user visually checking the degree of soiling of the rotating brush 31. In this case, for example, the user inputs whether cleaning needs to be performed or not, the cleaning intensity, and the like to the operation unit 16 based on the degree of soiling of the rotating brush 31. The switching mechanism 46 is controlled by the control unit 15 based on the instruction input to the operation unit 16. The switching mechanism 46 switches the position of the cleaning member 41 based on the instruction input to the operation unit 16.

The transport device 21 may include a detector 47. The detector 47 is configured to detect the degree of soiling of the rotating brush 31. The detector 47 is, for example, an optical sensor. The detector 47 detects, for example, an amount of foreign materials adhering to the brush portion 32 by irradiating the brush portion 32 with light. The detector 47 detects the degree of soiling of the rotating brush 31 based on the amount of foreign materials adhering to the brush portion 32. The detector 47 is not limited to an optical sensor and may be, for example, a digital camera.

The detector 47 may detect the degree of soiling of the rotating brush 31 by detecting turbidity of the cleaning liquid stored in the storage tank 36. Foreign materials removed from the outer circumferential surface 27 by the rotating brush 31 may flow out from the brush portion 32 into the cleaning liquid stored in the storage tank 36. In particular, droplets removed from the outer circumferential surface 27 by the rotating brush 31 easily flow out into the cleaning liquid. At this time, the droplets flow out into the cleaning liquid, while fluff, dust and the like tend to remain on the brush portion 32. Therefore, it can be presumed that the degree of soiling of the rotating brush 31 increases as the turbidity of the cleaning liquid increases. Therefore, the detector 47 detects the degree of soiling of the rotating brush 31 based on the turbidity of the cleaning liquid stored in the storage tank 36. The switching mechanism 46 may locate the cleaning member 41 at the contact position when the control unit 15 determines that cleaning of the rotating brush 31 is necessary based on the degree of soiling of the rotating brush 31 detected by the detector 47.

The transport device 21 may include a vibration applying unit 48. The vibration applying unit 48 is attached to the cleaning member 41. The vibration applying unit 48 is attached to the support portion 42, for example. The vibration applying unit 48 is configured to apply vibration to the cleaning member 41. By the vibration applying unit 48 applying vibration to the cleaning member 41, the cleaning member 41 comes into contact with the brush portion 32 in a vibrating state. This facilitates removal of foreign materials from the brush portion 32. For example, the vibration applying unit 48 vibrates the cleaning member 41 so that the cleaning member 41 reciprocates in a direction in which the shaft portion 33 extends, that is, in the X direction.

The vibration applying unit 48 may be a vibrator that applies a vibration of a high-frequency wave such as an ultrasonic wave, or may be an actuator that applies a vibration of a low-frequency. For example, the vibration applying unit 48 may be configured to change at least one of amplitude of vibration applied to the cleaning member 41 or a frequency of vibration applied to the cleaning member 41. For example, by the control unit 15 controlling the vibration applying unit 48, the amplitude of vibration applied to the cleaning member 41 and the frequency of vibration applied to the cleaning member 41 are controlled. When the amplitude of vibration applied to the cleaning member 41 is increased, cleaning ability of the cleaning member 41 is improved. This is because the brush portion 32 moves more greatly due to contact with the plurality of protrusions 44.

When the frequency of vibration applied to the cleaning member 41 is increased, the cleaning ability of the cleaning member 41 is improved. This is because the number of times of contact and the number of times of friction among the plurality of protrusions 44 and the brush portion 32 per unit time increase.

At least one of the amplitude of vibration or the frequency of vibration applied by the vibration applying unit 48 may be selected based on the degree of soiling of the rotating brush 31. For example, at least one of the amplitude of vibration or the frequency of vibration applied by the vibration applying unit 48 may be selected based on the degree of soiling of the rotating brush 31 visually checked by the user. For example, at least one of the amplitude of vibration or the frequency of vibration applied by the vibration applying unit 48 may be selected based on the degree of soiling of the rotating brush 31 detected by the detector 47. When the degree of soiling of the rotating brush 31 is large, the amplitude of vibration applied by the vibration applying unit 48 increases. When the degree of soiling of the rotating brush 31 is large, the frequency of vibration applied by the vibration applying unit 48 increases. Note that information about at least one of the amplitude or the frequency may be input to the control unit 15 by the user through the operation unit 16. At least one of the amplitude or the frequency is an example of the cleaning intensity.

Functions and Effects

Next, the functions and effects of the embodiment described above will be described.

(1) The transport device 21 includes the cleaning member 41 that cleans the rotating brush 31. The cleaning member 41 includes the contact portion 43 that comes into contact with the brush portion 32. The contact portion 43 includes the plurality of protrusions 44.

According to the configuration described above, the rotating brush 31 is cleaned by the cleaning member 41 coming into contact with the brush portion 32. At this time, the plurality of protrusions 44 come into contact with the brush portion 32 so as to enter the brush portion 32. Thus, foreign materials are removed from the brush portion 32. Therefore, the cleaning ability of the rotating brush 31 can be maintained.

(2) The transport device 21 includes the vibration applying unit 48 that applies vibration to the cleaning member 41.

According to the configuration described above, the cleaning member 41 is vibrated by the vibration applying unit 48. When the cleaning member 41 comes into contact with the brush portion 32 in a vibrating state, foreign materials can be easily removed from the brush portion 32.

(3) The control unit 15 controls at least one of the amplitude of the vibration applied to the cleaning member 41 or the frequency of the vibration applied to the cleaning member 41 by controlling the vibration applying unit 48. According to the configuration described above, the cleaning ability of the cleaning member 41 can be changed.

(4) The cleaning member 41 comes into contact with a portion, of the brush portion 32, immersed in the cleaning liquid stored in the storage tank 36.

According to the above-described configuration, the plurality of protrusions 44 come into contact with the portion of the brush portion 32 that is immersed in the cleaning liquid. This facilitates removal of foreign materials from the brush portion 32.

(5) The switching mechanism 46 switches a position of the cleaning member 41 between the contact position where the contact portion 43 comes into contact with the brush portion 32 and the retracted position where the contact portion 43 is separated from the brush portion 32.

According to the above configuration, by switching the position of the cleaning member 41 to the retracted position when the brush portion 32 is not cleaned, the load applied to the rotating brush 31 is reduced.

(6) The switching mechanism 46 switches the contact strength of the cleaning member 41 with respect to the brush portion 32 by switching the position of the cleaning member 41. According to the configuration described above, the cleaning ability of the cleaning member 41 can be changed.

Modifications

The present example can be modified and implemented as follows. The present example and the following modifications can be combined and implemented within a technically consistent range.

Figure 4:
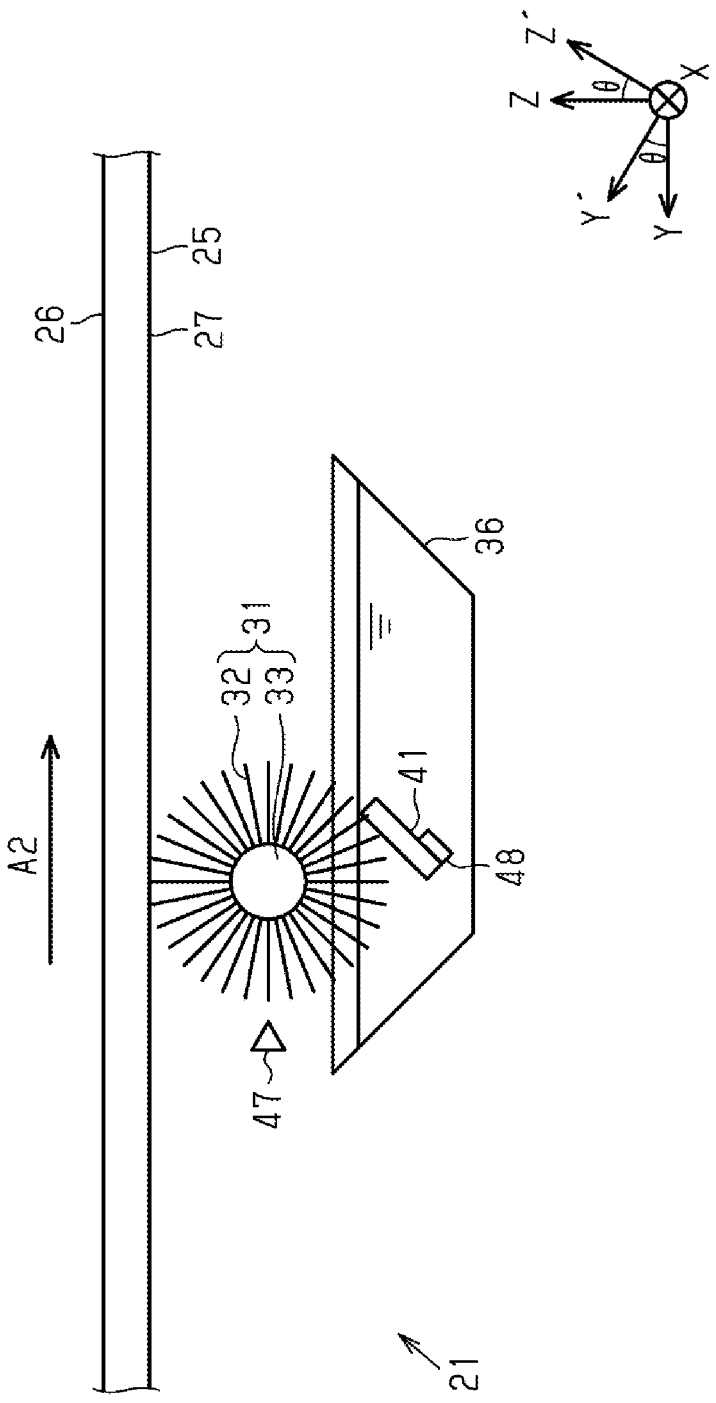
FIG. 4 is a side view illustrating a modification of the transport device.

As illustrated in FIG. 4, the cleaning member 41 may constantly come into contact with the brush portion 32. That is, the transport device 21 need not include the switching mechanism 46. For example, in the modification illustrated in FIG. 4, the cleaning member 41 is located extending not in the Y' direction but in the Z' direction. In this modification, the cleaning member 41 constantly comes into contact with the brush portion 32, so that contact resistance is constantly generated in the rotating brush 31. Therefore, the cleaning member 41 may come into contact with the rotating brush 31 so that the contact resistance with the rotating brush 31 is reduced when the rotating brush 31 rotates in the same direction as a circulation direction of the transporting belt 25. For example, the cleaning member 41 may be located so that the rotating brush portion 32 comes into contact with the cleaning member 41 from a base end toward a tip thereof. Thus, when the rotating brush 31 cleans the transporting belt 25, a load applied to the rotating brush 31 by the cleaning member 41 can be reduced as much as possible. For the purpose of cleaning the rotating brush 31, the driving unit 34 may rotate the rotating brush 31 in a direction opposite to the circulation direction of the transporting belt 25. In this case, the rotating brush 31 rotating comes into contact with the cleaning member 41 from the tip toward the base end. Accordingly, the contact resistance applied to the rotating brush 31 by the cleaning member 41 increases. As a result, foreign materials can be easily removed from the rotating brush 31.

Figure 5:
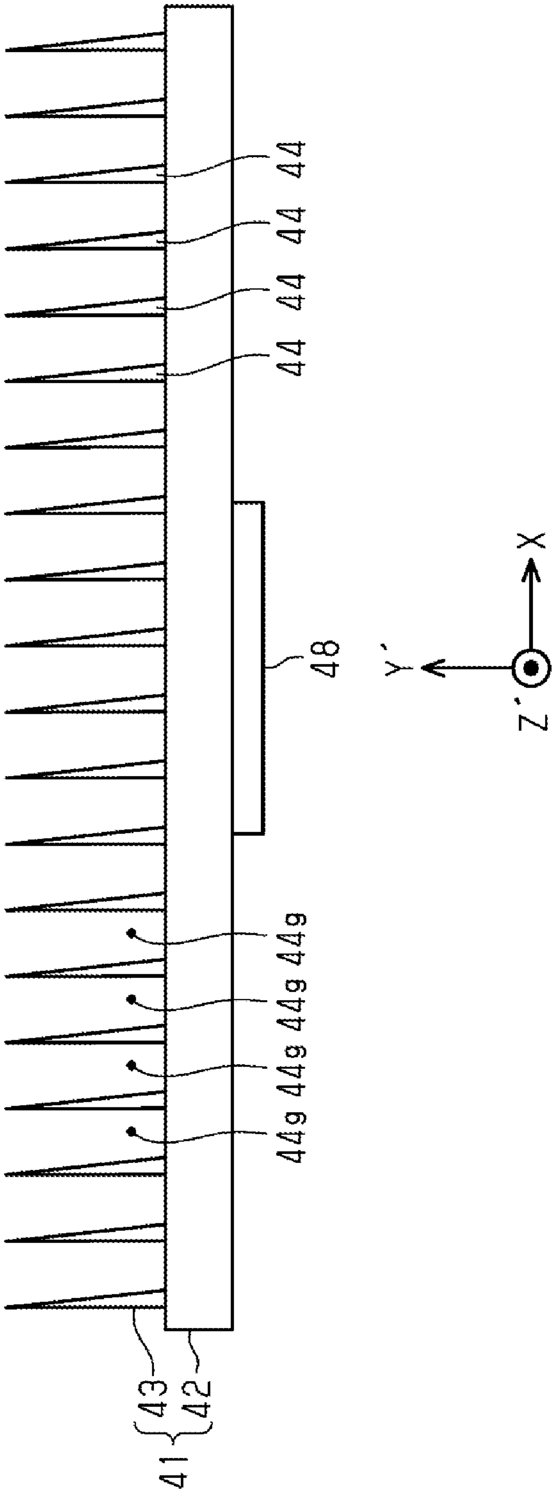
FIG. 5 is a top view of a modification of the cleaning member.

As illustrated in FIG. 5, the plurality of protrusions 44 may be, for example, a plurality of cutter blades capable of cutting foreign materials. In this case, the plurality of protrusions 44 can catch or cut foreign materials adhering to the brush portion 32. As a result, foreign materials can be easily removed from the brush portion 32.

Figure 6:
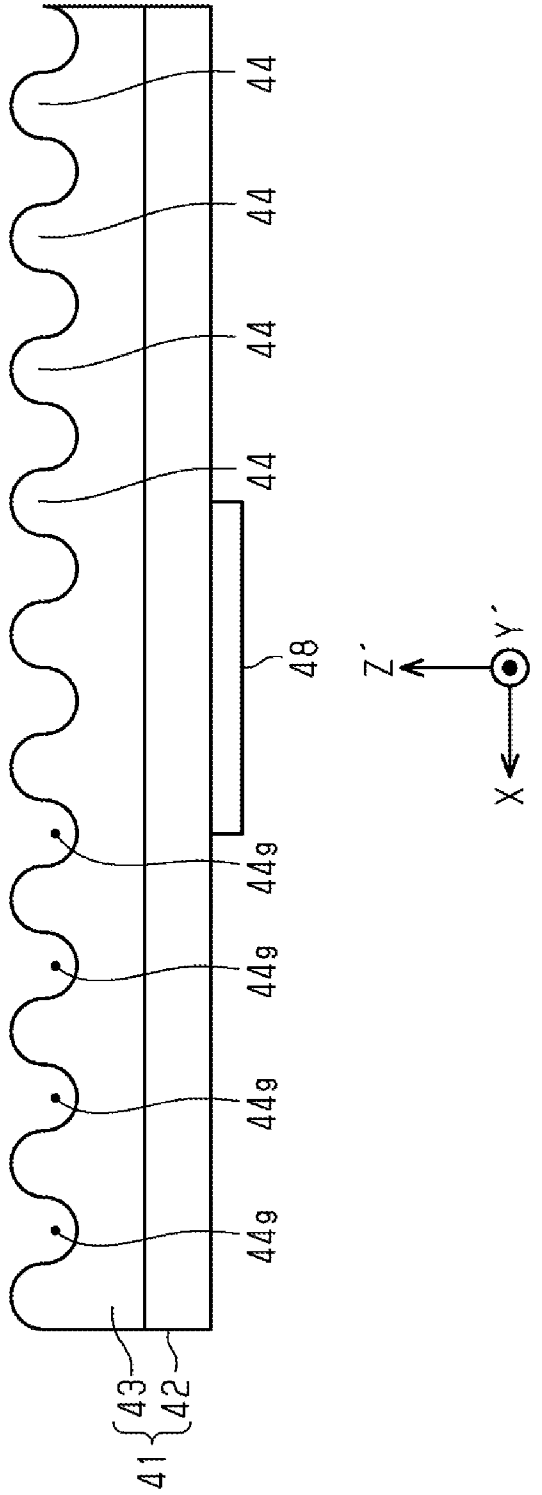
FIG. 6 is a front view of another modification of the cleaning member.

As illustrated in FIG. 6, the plurality of protrusions 44 may have, for example, a wavy shape as viewed from the Y' direction. Also in this case, the plurality of protrusions 44 can catch or tear off foreign materials adhering to the brush portion 32. As a result, foreign materials can be easily removed from the brush portion 32. It is sufficient that the brush portion 32 comes into contact with the contact portion 43. Note that the plurality of protrusions 44 may have, for example, a wavy shape as viewed from the Z' direction.

The cleaning member 41 is not limited to a blade but may be a brush. In this case, brush density of the cleaning member 41 may be higher than that of the brush portion 32. When the brush density is high, foreign materials can be easily removed from the brush portion 32. In addition, brush hardness of the cleaning member 41 may be higher than that of the brush portion 32. When the brush hardness is high, foreign materials can be easily removed from the brush portion 32.

The droplet ejected by the ejecting unit 12 is not limited to ink, and may be, for example, a liquid material including particles of a functional material dispersed or mixed in liquid. For example, the ejecting unit 12 may eject a liquid material including a material such as an electrode material or a pixel material used in manufacture of a liquid crystal display, an electroluminescent (EL) display, and a surface emitting display in a dispersed or dissolved form.

Technical Idea

Hereinafter, technical concepts and effects thereof that are understood from the above-described embodiments and modified examples will be described.

(A) A transport device includes a transporting belt including an outer circumferential surface configured to come into contact with a medium, the transporting belt being configured to transport the medium, a rotating brush including a brush portion configured to come into contact with the outer circumferential surface, the rotating brush being configured to rotate, and a cleaning member including a contact portion configured to come into contact with the brush portion, the cleaning member being configured to clean the rotating brush, in which the contact portion includes a plurality of protrusions.

According to the above-described configuration, the rotating brush is cleaned by the cleaning member coming into contact with the brush portion. At this time, the plurality of protrusions come into contact with the brush portion so as to enter the brush portion. Thus, foreign materials are removed from the brush portion. Therefore, cleaning ability of the rotating brush can be maintained.

(B) The transport device described above may include a vibration applying unit configured to apply vibration to the cleaning member.

According to the configuration described above, the cleaning member is vibrated by the vibration applying unit. When the cleaning member comes into contact with the brush portion in a vibrating state, foreign materials can be easily removed from the brush portion.

(C) The transport device described above may include a control unit configured to control the vibration applying unit, in which the control unit may control at least one of an amplitude of the vibration applied to the cleaning member or a frequency of the vibration applied to the cleaning member by controlling the vibration applying unit. According to the configuration described above, the cleaning ability of the cleaning member can be changed.

(D) The transport device described above may include a storage tank configured to store a cleaning liquid, in which the rotating brush may be located with a part of the brush portion immersed in the cleaning liquid stored in the storage tank, and the cleaning member may come into contact with a portion, of the brush portion, immersed in the cleaning liquid stored in the storage tank. According to the configuration described above, the plurality of protrusions come into contact with the portion of the brush portion that is immersed in the cleaning liquid. This makes it easier to remove foreign materials from the brush portion.

(E) The transport device described above may include a switching mechanism configured to switch a position of the cleaning member, in which the switching mechanism may switch the position of the cleaning member between a contact position where the contact portion comes into contact with the brush portion and a retracted position where the contact portion is separated from the brush portion. According to the configuration described above, a load applied to the rotating brush is reduced by switching the position of the cleaning member to the retracted position when the brush portion is not cleaned.

(F) In the transport device described above, the switching mechanism may switch contact strength of the cleaning member with respect to the brush portion by switching the position of the cleaning member. According to the configuration described above, the cleaning ability of the cleaning member can be changed.

(G) A droplet ejecting device includes a ejecting unit configured to eject a droplet onto a medium, a transporting belt including an outer circumferential surface configured to come into contact with a medium, the transporting belt being configured to transport the medium, a rotating brush including a brush portion configured to come into contact with the outer circumferential surface, the rotating brush being configured to rotate, and a cleaning member including a contact portion configured to come into contact with the brush portion, the cleaning member being configured to clean the rotating brush, in which the contact portion includes a plurality of protrusions. According to the configuration described above, it is possible to obtain the same effects as those of the transport device described above.

What is claimed is:

1. A transport device, comprising:

a transporting belt including an outer circumferential surface configured to come into contact with a medium, the transporting belt being configured to transport the medium;

a rotating brush including a brush portion configured to come into contact with the outer circumferential surface, the rotating brush being configured to rotate;

a cleaning member including a contact portion configured to come into contact with the brush portion, the cleaning member being configured to clean the rotating brush; and a storage tank configured to store a cleaning liquid, wherein the contact portion includes a plurality of protrusions, the rotating brush is located with a part of the brush portion immersed in the cleaning liquid stored in the storage tank, and the cleaning member comes into contact with a portion, of the brush portion, immersed in the cleaning liquid stored in the storage tank.

2. The transport device according to claim 1, further comprising a vibration applying unit configured to apply vibration to the cleaning member.

3. The transport device according to claim 2, further comprising a control unit configured to control the vibration applying unit, wherein the control unit controls at least one of an amplitude of the vibration applied to the cleaning member or a frequency of the vibration applied to the cleaning member by controlling the vibration applying unit.

4. The transport device according to claim 1, further comprising a switching mechanism configured to switch a position of the cleaning member, wherein the switching mechanism switches the position of the cleaning member between a contact position where the contact portion comes into contact with the brush portion and a retracted position where the contact portion is separated from the brush portion.

5. The transport device according to claim 4, wherein the switching mechanism switches contact strength of the cleaning member with respect to the brush portion by switching the position of the cleaning member.

6. A droplet ejecting device, comprising:

an ejecting unit configured to eject a droplet onto a medium;

a transporting belt including an outer circumferential surface configured to come into contact with a medium, the transporting belt being configured to transport the medium;

a rotating brush including a brush portion configured to come into contact with the outer circumferential surface, the rotating brush being configured to rotate; and a cleaning member including a contact portion configured to come into contact with the brush portion, the cleaning member being configured to clean the rotating brush; and a storage tank configured to store a cleaning liquid, wherein the contact portion includes a plurality of protrusions, the rotating brush is located with a part of the brush portion immersed in the cleaning liquid stored in the storage tank, and the cleaning member comes into contact with a portion, of the brush portion, immersed in the cleaning liquid stored in the storage tank.

7. A transport device, comprising:

a transporting belt including an outer circumferential surface configured to come into contact with a medium, the transporting belt being configured to transport the medium;

a rotating brush including a brush portion configured to come into contact with the outer circumferential surface, the rotating brush being configured to rotate;

a cleaning member including a contact portion configured to come into contact with the brush portion, the cleaning member being configured to clean the rotating brush; and a switching mechanism configured to switch a position of the cleaning member, wherein the contact portion includes a plurality of protrusions, and the switching mechanism switches the position of the cleaning member between a contact position where the contact portion comes into contact with the brush portion and a retracted position where the contact portion is separated from the brush portion.

8. The transport device according to claim 7, further comprising a vibration applying unit configured to apply vibration to the cleaning member.

9. The transport device according to claim 8, further comprising a control unit configured to control the vibration applying unit, wherein the control unit controls at least one of an amplitude of the vibration applied to the cleaning member or a frequency of the vibration applied to the cleaning member by controlling the vibration applying unit.

10. The transport device according to claim 7, wherein the switching mechanism switches contact strength of the cleaning member with respect to the brush portion by switching the position of the cleaning member.

* * * * *